UNITED STATES PATENT OFFICE.

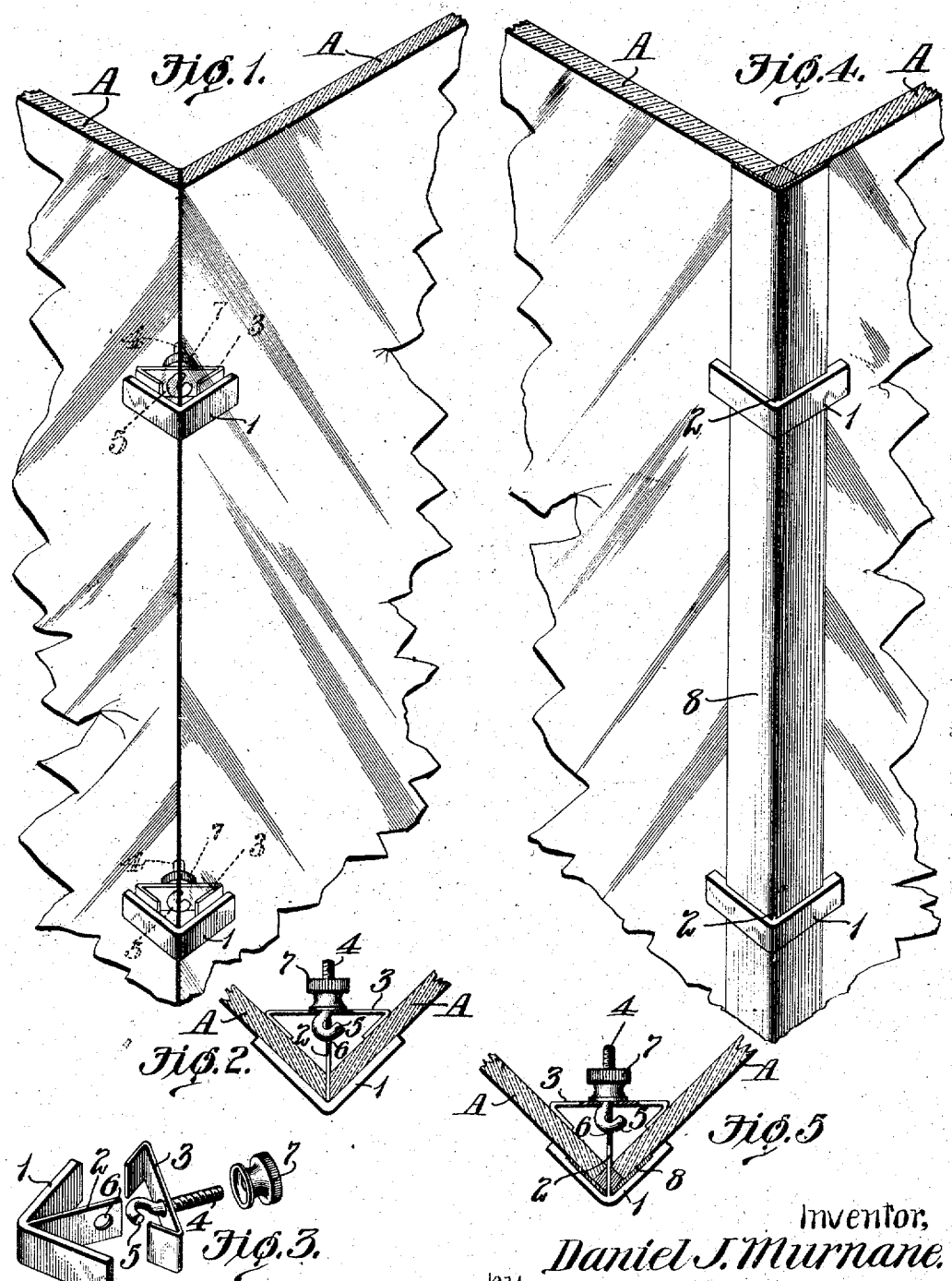

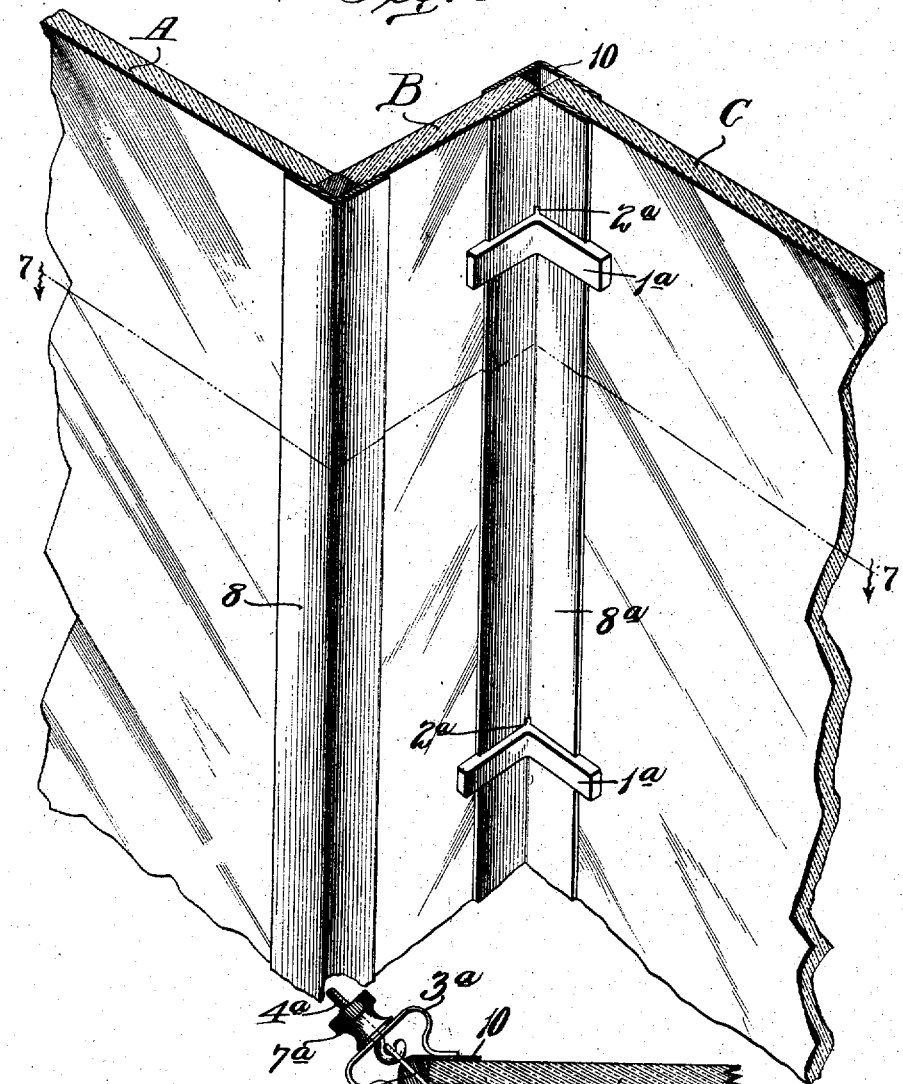

DANIEL J. MURNANE, OF KIRKWOOD, MISSOURI.

DEVICE FOR CONNECTING GLASS PLATES TOGETHER.

No. 877,107.

Specification of Letters Patent.

Patented Jan. 21, 1908.

Application filed January 2, 1907. Serial No. 350,387.

*To all whom it may concern:*

Be it known that I, DANIEL J. MURNANE, a citizen of the United States, residing at Kirkwood, St. Louis county, Missouri, have invented a certain new and useful Improvement in Devices for Connecting Glass Plates Together, of which the following is a full, clear, and exact description, such as will enable others skilled in the art to which it appertains to make and use the same, reference being had to the accompanying drawings, forming part of this specification, in which—

Figure 1 is a perspective view illustrating my improved device used for connecting together two glass plates which have their meeting edges beveled or mitered; Fig. 2 is a detail cross sectional view; Fig. 3 is a detail perspective view showing the elements which comprise the outside clamping member disassembled; Fig. 4 is a view similar to Fig. 1, showing one way in which I connect two plates of glass having square edges; Fig. 5 is a detail cross sectional view of the parts shown in Fig. 4; Fig. 6 is a perspective view illustrating the way in which I connect two glass plates that are arranged to form an inside angle, this figure also showing a different form of outside clamping member used on an outside corner; and Fig. 7 is a cross sectional view taken on the line 7—7 of Fig. 6.

This invention relates to devices for connecting together two plates of glass arranged at an angle to each other, such, for example, as the devices used in the construction of show-cases and corner windows.

One object of my invention is to provide a device for the purpose mentioned, that is of simple construction, and which comprises an outside clamping member provided with a shank or web of uniform thickness throughout its length, which is arranged between the meeting edges of the glass plates and an adjustable clamping member mounted on a screw having a hook which enters an opening in the inner end of the shank of the outside clamping member.

Another object of my invention is to provide a novel means of connecting together two plates of glass which have square edges, said means consisting of an outside corner-piece extending the full length of the plates, outside clamping members having devices which extend through openings in the corner-piece and are arranged between the meeting edges of the glass plates, inside clamps and means for drawing said inside clamps and corner-piece toward each other to cause them to securely clamp the plates. And still another object of my invention is to provide an outside clamping member extending the full length of the glass and provided with a plurality of inwardly extending shanks or webs to which inside adjustable clamps are connected.

Referring to Fig. 1 of the drawings which illustrates the device which I use for fastening together two plates of glass A arranged to form an outside corner and having their meeting edges mitered or beveled, 1 designates the outside clamping member which is approximately V-shape, and 2 designates a web or shank formed integral with the outside clamping member and arranged between the meeting edges of the two glass plates, as shown in Fig. 2. This shank or web 2 is comparatively thin and is of uniform thickness throughout its length so that when placing the clamping member in operative position it will not be necessary to have the edges of the glass plates arranged very far apart.

The inside clamping member consists of a clamp 3 adapted to engage the inside faces of the glass plates, a screw 4 on which said clamp is mounted and provided at one end with a hook 5 which enters an opening 6 in the shank 2 of the outside clamping member, and an adjustable nut 7 mounted on the screw for drawing the outside clamping member and the clamp 3 toward each other so that they will securely clamp together the plates of glass which are arranged between them. The number of these devices which are employed for connecting two plates together, of course, will depend on the length of the plates, the devices being arranged at suitable distances from each other, as shown in Fig. 1.

The plates which are to be connected together are first arranged with their meeting edges separated a distance equal to the thickness of the shank 2 of the outside clamping member and said clamping member is then placed in position with its shank projecting between the edges of the plates. The hook 5 on the screw of the inside clamping member is then inserted in the opening 6 in the shank of the outside clamping member and the nut 7 is then adjusted to force the inside clamp 3 into engagement with the inside faces of the plates A and thus cause said plates to be securely clamped between said clamp and the outside member 1 which embraces said plates, the crack between the edges of the plates then being filled with putty or some other material to make an air-tight joint.

A device of this construction is not only inexpensive to manufacture but does not necessitate an adjustment of the plates relatively to each other after the outside clamping member has been placed in position. The devices which have heretofore been used for connecting together two glass plates consisted of an outside clamping member provided with a shank or web having a thickened portion to receive screw-threads or a separate screw on which the adjusting nut for the inside clamp was mounted so that when placing the outside clamping member in position it was necessary to have the meeting edges of the plates separated a distance equal to the thickness of the thickened portion of the shank, or else grind out the edges of the plates to receive said thickened portion. Consequently, after the outside clamping member had been placed in position the glass plates had to be moved relatively to each other to get their meeting edges together as close as possible. This additional adjustment of the glass plates is entirely eliminated when my improved clamping device is used as the plates are at first placed in the position which they occupy after they are connected together. The device also presents a neat and ornamental appearance and as previously stated, can be manufactured at a small cost, the outside clamping member with its integral shank being preferably cast and the inside clamp being of pressed metal.

In Figs. 4 and 5 I have shown a device adapted to be used for connecting together two glass plates in which the edges have not been beveled or mitered. In fastening together plates of this character; namely, those in which the meeting edges are square, I use an outside corner-piece 8 extending the full length of the plates, as shown in Fig. 4, this corner-piece conforming in shape to the angle which the plates form. The corner-piece is provided with openings through which the shanks 2 of the outside clamping members 1 extend, and the inside faces of the outside clamping members are rabbeted out slightly to receive the corner-piece 8. The space between the edges of the plates and the inside of the corner-piece will be filled with putty, wood, cement or some other suitable material to make an air-tight joint. By constructing the outside clamping members in this way, the portions thereof which project beyond the edges of the corner-piece will prevent the inside clamps from being seen from outside the window or show-case, and as said projecting portions do not come in contact with the plates of glass, the corner-piece will be drawn into intimate engagement with the plates when the nuts 7 are adjusted. Accordingly, I am enabled to use an outside corner-piece of very small dimensions, preferably, just sufficient to cover up the corner formed by the junction of the two plates.

While I prefer to use outside clamping members 1 of the construction shown in Fig. 3 it is not necessary that this form of clamping member be used as various means could be employed for holding the corner-piece in engagement with the plates and cause said plates to be clamped between said corner-piece and a coöperating member or members.

If desired, I can use an outside corner-piece or clamping member 8$^b$ extending the entire length of the plates and provided with a plurality of shanks 2$^b$ that project inwardly between the meeting edges of the plates A and B, as shown in the left-hand portion of Fig. 6. Inside clamping members 3 of the construction previously described can be used in combination with this continuous outside clamping member, or, if desired, other kinds of inside clamping members could be employed, my broad idea being the combination of a continuous outside clamping member, coöperating inside clamping members and means for drawing said members together to cause them to firmly clamp two glass plates. For connecting together two glass plates that are arranged to form an inside corner such, for example, as the plates B and C shown in the right-hand portion of Fig. 6, I use an outside clamping member 1$^a$ that is approximately $\Lambda$-shape instead of V-shape, as shown in Figs. 1 to 5, the corner-piece 8$^a$ also being the same shape as the outside clamping member. In this construction I also use an inside corner-piece 10 which embraces the inside faces of the sheets B and C. The outside clamping member has a shank or web 2$^a$ that is arranged between the meeting edges of the plates and extends through openings in the inside and outside corner-pieces, and an inside clamp 3$^a$ is adjustably mounted on a screw 4$^a$ that is detachably connected to the shank 2$^a$, the inside and outside corner-pieces being drawn together by a nut 7$^a$ which actuates the clamp 3$^a$.

Having thus described my invention, what I claim as new and desire to secure by Letters Patent is:

1. Means for connecting together two plates of glass arranged at an angle to each other, comprising an outside corner-piece embracing said plates and extending the entire length thereof, a plurality of outside clamping members conforming in shape to the corner-piece and each being provided with a rigid shank of uniform thickness throughout its entire length that projects inwardly through an opening in the corner-piece, said shanks extending between the meeting edges of the plates, and inside clamps connected to said shanks; substantially as described.

2. In combination, a plurality of plates arranged at an angle to each other, an outside corner-piece embracing said plates, an outside clamping member conforming in shape to the corner-piece and provided with a rigid integral shank of uniform thickness which passes through an opening in the corner-piece and projects between the meeting edges of said plates the inside face of said clamping member being recessed to receive the corner piece, and an inside clamping member detachably connected to the inner end of said shank; substantially as described.

3. Means for connecting together two plates of glass arranged at an angle to each other, comprising an outside corner-piece embracing said plates and extending the entire length thereof, a plurality of outside clamping members which overlap portions of said corner-piece and are provided with rigid shanks of uniform thickness throughout their entire length that project inwardly through openings in the corner-piece and extend between the meeting edges of the plates, and inside clamps detachably connected to the outside clamping members; substantially as described.

4. In combination, a plurality of plates arranged at an angle to each other and provided with square edges, an outside corner-piece embracing said plates, a filler occupying the space between the corner-piece and the edges of said plates, outside clamping members which engage portions of the corner-piece and force it into snug engagement with the plates, said clamping members being provided with shanks that pass through openings in the corner-piece and extend between the meeting edges of the plates, and inside adjustable clamping members provided with hooks which enter openings in the shanks of the outside clamping members; substantially as described.

5. In combination, a plurality of plates arranged at an angle to each other, an outside corner-piece embracing said plates and extending the entire length thereof, a plurality of outside clamping members which overlap said corner-piece and force it into snug engagement with the plates, said clamping members being provided with shanks that pass through openings in the corner-piece and extend between the meeting edges of the plates, and inside clamps detachably connected to the outside clamping members; substantially as described.

6. Means for connecting together two plates of glass arranged at an angle to each other, comprising an outside clamping member extending approximately the entire length of said plates, inside clamping members, devices embracing the outside clamping member and arranged in alinement with the inside clamping members, said devices having portions which project laterally beyond the side edges of said outside clamping member to hide the inside clamping members, and means for drawing said inside and outside clamping members into intimate engagement with the plates of glass; substantially as described.

7. Means for connecting together two plates of glass arranged at an angle to each other, comprising an outside clamping member which extends approximately the entire length of said plates, inside clamping members, devices embracing the outside clamping member and arranged in alinement with the inside clamping members, and means for connecting said inside clamping members to the devices that embrace the outside clamping member; substantially as described.

In testimony whereof I hereunto affix my signature in the presence of two witnesses, this twenty eighth day of December 1906.

DANIEL J. MURNANE.

Witnesses:
WELLS L. CHURCH,
GEORGE BAKEWELL.